(12) United States Patent
Sugiyama (10) Patent No.: US 11,714,345 B2
(45) Date of Patent: Aug. 1, 2023

(54) LIGHT SOURCE UNIT AND PROJECTOR

(71) Applicant: CASIO COMPUTER CO., LTD., Tokyo (JP)

(72) Inventor: Chihaya Sugiyama, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/592,026

(22) Filed: Feb. 3, 2022

(65) Prior Publication Data

US 2022/0155663 A1     May 19, 2022

Related U.S. Application Data

(63) Continuation of application No. 16/719,997, filed on Dec. 19, 2019, now Pat. No. 11,275,298.

(30) Foreign Application Priority Data

Dec. 19, 2018 (JP) ................. 2018-237488

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/2066* (2013.01)

(58) Field of Classification Search
None
See application file for complete search history.

(56) References Cited

U.S. PATENT DOCUMENTS

| 9,843,780 B2 | 12/2017 | Ogawa |
| 10,091,470 B2 | 10/2018 | Wu et al. |
| 10,139,718 B2 | 11/2018 | Kado |

(Continued)

FOREIGN PATENT DOCUMENTS

| CN | 103048863 A | 4/2013 |
| CN | 108287448 A | 7/2018 |

(Continued)

OTHER PUBLICATIONS

Japanese Office Action dated Jul. 21, 2022 (and English translation thereof) issued in counterpart JP Application No. 2018-237488.

(Continued)

*Primary Examiner* — Bao-Luan Q Le
*Assistant Examiner* — Danell L Owens
(74) *Attorney, Agent, or Firm* — Holtz, Holtz & Volek PC (57) ABSTRACT

A light source unit includes a first light emitting device configured to emit light in a first wavelength range, a luminescent wheel comprising a luminescent light emitting area configured to emit luminescent light that is excited by the light in the first wavelength range as light in a second wavelength range, and a color wheel onto which the light in the first wavelength range and the light in the second wavelength range are shined. A filter selects a part of the wavelength from the shined light in the first wavelength range and the light in the second wavelength range. A wheel surface of the color wheel is inclined with respect to axes of the light in the first wavelength range and the light in the second wavelength range.

18 Claims, 6 Drawing Sheets

(56) References Cited

U.S. PATENT DOCUMENTS

| | | | |
|---|---|---|---|
| 2002/0130977 A1 | 9/2002 | Hibi | |
| 2002/0145707 A1* | 10/2002 | Yoneyama | G03B 21/2066 353/84 |
| 2015/0253653 A1 | 9/2015 | Fujita et al. | |
| 2015/0362135 A1 | 12/2015 | Sugiyama | |
| 2016/0360166 A1 | 12/2016 | Ogawa | |
| 2018/0199013 A1* | 7/2018 | Wu | G03B 21/2013 |
| 2018/0239233 A1 | 8/2018 | Kado | |
| 2020/0050093 A1* | 2/2020 | Liao | G03B 33/08 |

FOREIGN PATENT DOCUMENTS

| | | |
|---|---|---|
| JP | 2002268006 A | 9/2002 |
| JP | 2002277820 A | 9/2002 |
| JP | 2010175763 A | 8/2010 |
| JP | 2012203262 A | 10/2012 |
| JP | 2013097123 A | 5/2013 |
| JP | 2014077980 A | 5/2014 |
| JP | 2016105122 A | 6/2016 |
| JP | 2017003643 A | 1/2017 |
| JP | 2017161627 A | 9/2017 |
| JP | 2018136506 A | 8/2018 |

OTHER PUBLICATIONS

Chinese Office Action (and English language translation thereof) dated Apr. 2, 2021 issued in counterpart Chinese Application No. 201911309031.4 (which is a Chinese counterpart of parent U.S. Appl. No. 16/719,997).

Notice of Allowance dated Nov. 8, 2021, issued in parent U.S. Appl. No. 16/719,997.

Office Action (Non-Final Rejection) dated Jul. 2, 2021 issued in parent U.S. Appl. No. 16/719,997.

Japanese Office Action dated Sep. 1, 2022 (and English translation thereof) issued in counterpart JP Application No. 2019-161105.

* cited by examiner

LIGHT SOURCE UNIT AND PROJECTOR

CROSS-REFERENCE TO RELATED APPLICATION

This patent application is a Continuation Application of U.S. application Ser. No. 16/719,997, filed Dec. 19, 2019, which is based upon and claims the benefit of priority under 35 USC 119 from Japanese Patent Application No. 2018-237488 filed on Dec. 19, 2018, the entire disclosure of which, including the description, claims, drawings, and abstract, is all incorporated herein by reference in its entirety.

BACKGROUND OF THE INVENTION

Field of the Invention

The present invention relates to a light source unit and a projector including the light source unit.

Description of the Related Art

There is known a projector in which light emitted from a light source is collected onto a micromirror display device called a digital micromirror device (DMD) or a liquid crystal panel so as to display a color image onto a screen. For example, Japanese Patent Laid Open No. 2017-3643 discloses a light source unit that includes a light source, a luminescent wheel, and a color wheel and in which the luminescent wheel is controlled to be synchronized with the color wheel to emit green, red and bluelight. The luminescent wheel includes a plurality of light source segments configured to emit light having wavelengths in different wavelength ranges by receiving light emitted from the light source unit. The light source segments include a green luminescent material layer, a yellow luminescent material layer and a red luminescent material layer, and a transmission area configured to transmit light having a wavelength in the blue wavelength range or, simply, light in the blue wavelength range. The color wheel includes a blue and green transmission area configured to transmit blue light and green light and a white transmission area configured to transmit red light, yellow light, green light, and blue light, and light in different wavelength ranges is shined from the luminescent wheel.

However, in the configuration where the luminescent material layers are provided on the luminescent wheel as in Japanese Patent Laid-Open No. 2017-3643, an extension range of the luminescent light emitting time is physically limited, and it is assumed that in some of the colors, a sufficient luminance to form an image cannot be secured. As a result, it sometimes becomes difficult to ensure the color balance of the whole of a projected image.

SUMMARY OF THE INVENTION

The present invention has been made in view of the situations described above, and an object of the present invention is to provide a light source unit which can improve the color balance and a projector including the light source unit.

According to an aspect of the present invention, there is provided a light source unit including a first light emitting device configured to emit light in a first wavelength range, a luminescent wheel including a luminescent light emitting area configured to emit luminescent light that is excited by the light in the first wavelength range as light in a second wavelength range, a second light emitting device configured to emit light in a third wavelength range that is distributed on a longer wavelength side than the light in the second wavelength range, a combining device configured to combine the light in the second wavelength range and the light in the third wavelength range to the same light axis, a color wheel including a plurality of areas, one of the plurality of areas constituting an area where to select the light in the third wavelength range and partial light on a long wavelength side of the light in the second wavelength range that are combined together by the combining device as light in a fourth wavelength range, and a control unit configured to control the first light emitting device, the second light emitting device, the luminescent wheel, and the color wheel to thereby control the light in the second wavelength range and the light in the fourth wavelength range in a time-sharing fashion.

According to another aspect of the present invention, there is provided a projector including the light source unit described above, a display device configured to generate image light, a projection optical system configured to project image light emitted from the display device on to a screen, and in the projector, the control unit controls the light source unit and the display device.

DETAILED DESCRIPTION OF THE PREFERRED EMBODIMENTS

First Embodiment

Figure 1:
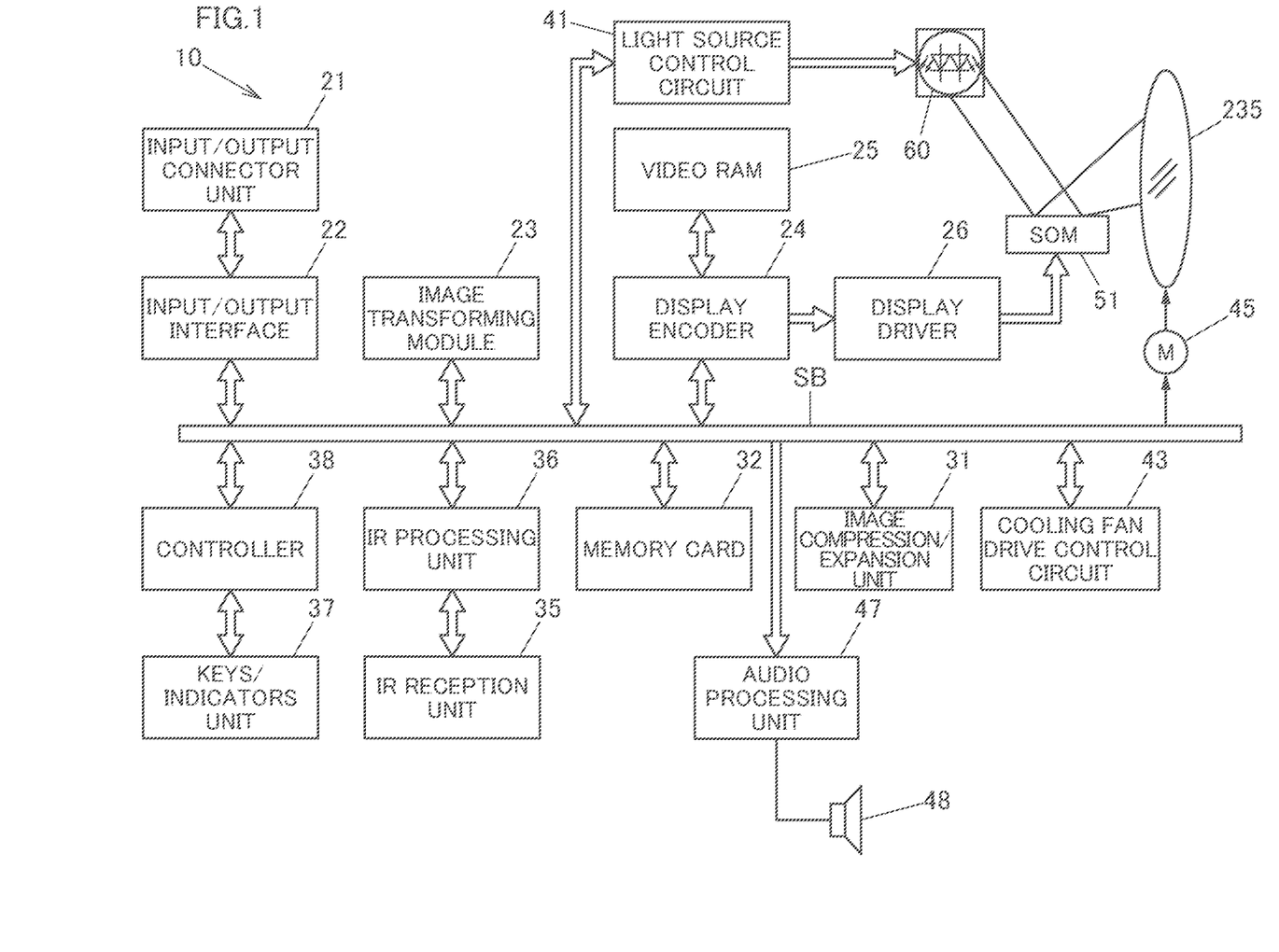
FIG. 1 is a block diagram illustrating functional circuit blocks of a projector according to a first embodiment of the present invention.

Hereinafter, a mode for carrying out the present invention will be described. FIG. 1 is a block diagram illustrating functional circuit blocks of a projector 10. A projector control unit (a control unit) includes a controller 38, an input/output interface 22, an image transforming module 23, a display encoder 24, a display driver 26, and the like. Image signals of various standards which are inputted from an input/output connector unit 21 are sent, via the input/output interface 22 and a system bus (SB), to the image transforming module 23, where the image signals are transformed so as to be unified into an image signal of a predetermined format which is suitable for display. Thereafter, the unified image signal is outputted to the display encoder 24.

The display encoder 24 deploys the inputted image signal on a video RAM 25 for storage in it and generates a video signal from the contents stored in the video RAM 25, outputting the video signal so generated to the display driver 26.

The display driver 26 drives a display device 51, which is a spatial optical modulator (SOM), at an appropriate frame rate according to the image signal outputted from the display encoder 24. Then, in the projector 10, pencils of light emitted from a light source unit 60 are shined on to the display device 51 by way of a light guiding optical system to thereby form an optical image by light reflected from the display device 51, and the image so formed is then projected onto a screen, not illustrated, for display by way of a projection optical system, which will be described later. A movable lens group 235 of the projection optical system is driven by a lens motor 45 for zooming and focusing.

An image compression/expansion unit 31 performs a recording process in which a luminance signal and a color difference signal of an image signal are data compressed through processing of Adaptive Discrete Cosine Transform (ADCT) and Huffman coding, and the compressed data is sequentially written on a memory card 32, which constitutes a detachable recording medium. Further, with the projector 10 set in a reproducing mode, the image compression/expansion unit 31 reads out the image data recorded in the memory card 32 and expands the individual image data that makes up a series of dynamic images frame by frame. Then, the image compression/expansion unit 31 outputs the image data to the display encoder 24 by way of the image transforming module 23 and enables the display of dynamic images based on the image data stored in the memory card 32.

The controller 38 governs the control of operations of individual circuitries inside the projector 10 and includes CPU, ROM storing fixedly operation programs such as various settings, RAM that is used as a work memory, and the like.

A keys/indicators unit 37 is made up of keys and indicators that are provided on a casing of the projector 10. Operation signals from the keys/indicators unit 37 are sent out directly to the controller 38. Key operation signals from a remote controller are received by an IR reception unit 35 and are then demodulated into a code signal at an Ir processing unit 36 for output to the controller 38.

The controller 38 is connected with an audio processing unit 47 by way of a system bus (SB). This audio processing unit 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The controller 38 controls a light source control circuit 41. The light source control circuit 41 controls separately the operation of an excitation light shining device of the light source unit 60 so that light in predetermined wavelength ranges required in generating an image is emitted from the light source unit 60. Additionally, the light source control circuit 41 controls a synchronizing timing of a luminescent wheel 101 and a color wheel 201 (refer to FIG. 2 and the like) based on a command from the controller 38.

Further, the controller 38 causes a cooling fan drive control circuit 43 to detect temperatures with a plurality of temperature sensors which are provided in the light source unit 60 and the like so as to control revolution speeds of cooling fans based on the results of the temperature detections. Additionally, the controller 38 also causes the cooling fan drive control circuit 43 to keep the cooling fans revolving by use of a timer or the like even after a power supply to a main body of the projector 10 is switched off. Alternatively, the controller 38 causes the cooling fan drive control circuit 43 to cut off the power supply to the main body of the projector 10 depending upon the results of the temperature detections by the temperature sensors. In this way, the projector control unit including the controller 38 controls blue laser diodes 71 (a first light emitting device), a red light emitting diode 121 (a second light emitting device), the luminescent wheel 101, and the color wheel 201 to thereby control light having a wavelength in the green wavelength range or, simply, light in the green wavelength range (light in a second wavelength range) and light in a fourth wavelength range (part of light on a long wavelength side of the light in the green wavelength range (the light in the second wavelength range) in a time-sharing fashion.

Figure 2:
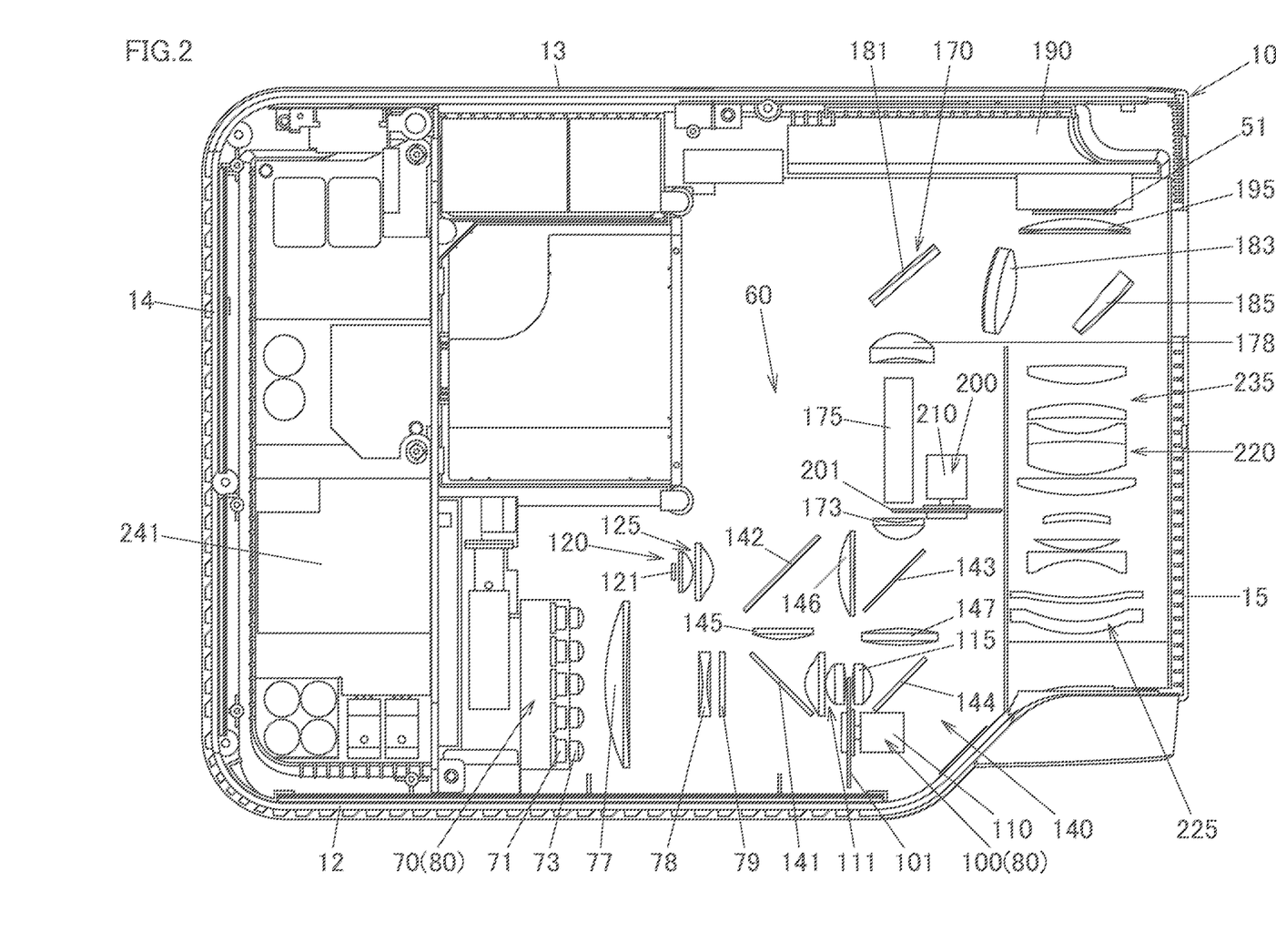
FIG. 2 is a schematic plan view illustrating an internal structure of the projector according to the first embodiment of the present invention.

FIG. 2 is a schematic plan view illustrating an internal structure of the projector 10. The projector 10 includes a control circuit board 241 in the vicinity of a right panel 14. This control circuit board 241 includes a power supply circuit block, a light source control block, and the like. The projector 10 also includes the light source unit 60, a light source-side optical system 170, and a projection optical system 220 on a left side of the control circuit board 241.

The light source unit 60 includes the excitation light shining device 70, which constitutes not only a light source of light of a wavelength in the blue wavelength range or, simply, light in the blue wavelength range (light in a first wavelength range) but also an excitation light source, a green light source device 80, which constitutes a light source of light of a wavelength in the green wavelength range or, simply, light in the green wavelength range (light in a second wavelength range), a red light source device 120, which constitutes a light source of light of a wavelength in the red wavelength range or, simply, light in the red wavelength range (light in a third wavelength range), and a color wheel device 200. The green light source device 80 is made up of the excitation light shining device 70 and a luminescent wheel device 100.

A light guiding optical system 140 is disposed in the light source unit 60, and this light guiding optical system 140 guides light in the blue wavelength range, light in the green wavelength range, and light in the red wavelength range. The light guiding optical system 140 guides light beams in the blue, green and red wavelength ranges that are emitted from the excitation light shining device 70, the green light source device 80, and the red light source device 120 to the light source-side optical system 170.

The excitation light shining device 70 is disposed in the vicinity of a front panel 12. The excitation light shining device 70 includes a light source group made up of the blue laser diodes 71, collective lenses 77, 78, and a diffuse plate 79. The blue laser diodes 71 (the first light emitting device) are semiconductor light emitting elements and are disposed in such a manner that optical axes thereof are parallel to a rear panel 13.

The light source group is formed by arranging the plurality of laser diodes 71 into a matrix configuration. Collimator lenses 73 are disposed individually on the optical axes of the blue laser diodes 71 so as to convert light emitted from the corresponding blue laser diodes 71 into parallel light to thereby enhance the directivity of the emitted light. The collective lens 77 and the collective lens 78 contract pencils of light emitted from the blue laser diodes 71 in one direction and emit them towards the diffuse plate 79. The diffusing plate 79 diffusion transmits light in the blue wavelength range that is incident thereon to a dichroic mirror 141 that is disposed on a side of the luminescent wheel 101.

The luminescent wheel device 100 is disposed on an optical path of excitation light emitted from the excition light shining device 70 and in the vicinity of the front panel 12. The luminescent wheel device 100 includes the luminescent wheel 101, a motor 110, a collective lens group 111, and a collective lens 115. The luminescent wheel 101 is disposed in such a manner as to be at right angles to an axis of light emitted from the excitation light shining device 70. The motor 110 drives and rotates the luminescent wheel 101.

Figure 3A:
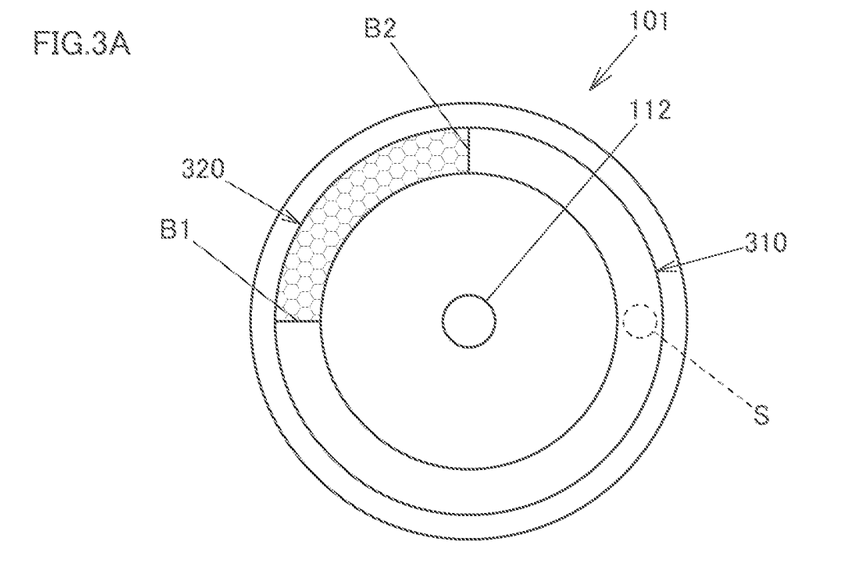
FIG. 3A is a schematic plan view of a luminescent wheel according to the first embodiment of the present invention.

Here, the configuration of the luminescent wheel 101 will be described. FIG. 3A is a schematic plan view of the luminescent wheel 101. The luminescent wheel 101 is formed into a disk shape and has a mounting hole portion 112 formed at a center thereof. Since the mounting hole portion 112 is fixed to a shaft portion of the motor 110, the luminescent wheel 101 can rotate around the shaft portion when the motor 110 is driven to rotate.

The luminescent wheel 101 includes a luminescent light emitting area 310 and a transmission area (a first transmission area) 320 that are provided end to end in a circumferential direction. The luminescent light emitting area 310 is formed through substantially 270 degrees, and the transmission area 320 is formed through the remaining angle, that is, substantially 90 degrees. A base material of the luminescent wheel 101 can be formed of a metallic material such as copper, aluminum, and the like. A surface of the base material that lies to face the excitation light shining device 70 is mirror finished through silver deposition or the like. The luminescent light emitting area 310 is formed on the mirror finished surface. A green luminescent material layer is formed on the luminescent light emitting area 310. The luminescent light emitting area 310 receives light in the blue wavelength range as excitation light from the excitation light shining device 70 and then emits luminescent light in the green wavelength range in every direction. This luminescent light is emitted from the luminescent wheel 101 towards the right panel 14 and is then incident on the collective lens group 111 shown illustrated in FIG. 2.

The transmission area 320 is disposed between ends of the luminescent light emitting area 310 while being separated from boundaries B1, B2. The transmission area 320 can be formed by fitting a transparent material having light transmission properties in a cut-out portion formed in the base material of the luminescent wheel 101. The transparent material is formed of a transparent material such as glass or resin. Additionally, a diffuse layer may be provided on a side onto which light in the blue wavelength range is shined or an opposite surface of the transparent material. The diffuse layer can be provided by forming minute irregularities on the relevant surface through sandblasting. Light in the blue wavelength range emitted from the excitation light shining device 70 to be incident on the transmission area 320 is transmitted or diffuse transmitted through the transmission area 320 and is then incident on the collective lens 115 illustrated in FIG. 2.

Returning to FIG. 2, the collective lens group 111 collects pencils of light in the blue wavelength range emitted from the excitation light shining device 70 to the luminescent wheel 101 and collects luminescent light emitted from the luminescent wheel 101 in the direction of the right panel 14. The collective lens 115 collects a pencil of light emitted from the luminescent wheel 101 in the direction of a left panel 15. The excitation light shining device 70 and the luminescent wheel device 100 are cooled by a heat sink and a cooling fan, not shown, that are provided in an interior of the projector 10.

The red light source device 120 includes the red light emitting diode 121 (the second light emitting device) that is a semiconductor light emitting device disposed in such a manner as to be parallel to the axis of light emitted from the blue laser diodes 71 and a collective lens group 125 that collects light in the red wavelength range emitted from the red light emitting diode 121. The red light source device 120 is disposed in such a manner that an axis of light in the red wavelength range emitted from the red light emitting diode 121 intersects an axis of light in the green wavelength range emitted from the luminescent wheel 101 and reflected by the dichroic mirror 141.

The light guiding optical system 140 includes the dichroic mirror 141, a first dichroic mirror 142 (a combining device), a second dichroic mirror 143, collective lenses 145, 146, 147 that collect pencils of light, a reflection mirror 144 that turns an axis of a pencil of light into the same light axis, and the like. Hereinafter, the individual constituent members will be described.

The dichroic mirror 141 is disposed between the diffuse plate 79 and the collective lens group 111. The dichroic mirror 141 transmits light in the blue wavelength range towards the collective lens group 111 and reflects light in the green wavelength range in the direction of the collective lens 145 to thereby turn an axis of the light in the green wavelength range trough 90 degrees.

The first dichroic mirror 142 constitutes a combining device that combines light in the green wavelength range (light in the second wavelength range) and light in the red wavelength range (light in the third wavelength range) into the same light axis and reflects light in the green wavelength range and transmits light in the red wavelength range. Light in the green wavelength range that is reflected by the dichroic mirror 141 is collected by the collective lens 145 and is then incident on the first dichroic mirror 142. Specifically, the first dichroic mirror (the combining device) reflects light in the green wavelength range (light in the second wavelength range) excluding light on a first long wavelength side and transmits light in the red wavelength range (light in the third wavelength range) or transmits light in the green wavelength range (light in the second wavelength range) excluding light on the first long wavelength side and reflects light in the red wavelength range (light in the third wavelength range) and guide the light in the green wavelength range (light in the second wavelength range) excluding the light on the first long wavelength side and the light in the red wavelength range (light in the third wavelength range) towards the color wheel.

The light in the green wavelength range reflected by the first dichroic mirror 142 is collected by the collective lens 146 and is then incident on the second dichroic mirror 143 disposed on a side of the collective lens 146 that lies to face the left panel 15. The second dichroic mirror 143 reflects light in the red wavelength range and light in the green wavelength range and transmits light in the blue wavelength range. Consequently, the second dichroic mirror 143 reflects the light in the red wavelength range and the light in the green wavelength range that the collective lens 146 collects to the collective lens 173 and guides the light in the red wavelength range and the light in the green wavelength range. Specifically, the second dichroic mirror 143 reflects the light in the green wavelength range (light in the second wavelength range) excluding the light on the first long wavelength side and the light in the red wavelength range (light in the third wavelength range) both of which are combined together by the first dichroic mirror 142 and transmits light in the blue wavelength range (light in the first wavelength range) or transmits the light in the green wavelength range (light in the second wavelength range) excluding the light on the first long wavelength side and the light in the red wavelength range (light in the third wavelength range) both of which are combined together by the first dichroic mirror 142 and reflects light in the blue wavelength range (light in the first wavelength range) to thereby guide the light in the blue wavelength range (light in the first wavelength range) and the light in the red wavelength range (light in the third wavelength range) to the color wheel 201.

On the other hand, when the transmission area 320 stays on a shining area S (refer to FIG. 3A) of light in the blue wavelength range, light in the blue wavelength range emitted from blue laser diodes 71 passes through the transmission area 320 and is then collected by the collective lens 115 to thereafter be guided to the reflection mirror 144. The reflection mirror 144 is disposed on an axis of light in the blue wavelength range that is transmitted or diffuse transmitted through the luminescent wheel 101. The reflection mirror 144 reflects light in the blue wavelength range and guides its light axis to the collective lens 147 that is disposed further towards the rear panel 13 than the reflection mirror 144. The second dichroic mirror 143 transmits the light in the blue wavelength range that is collected by the collective lens 147 to guide it towards the collective lens 173.

The light source-side optical system 170 includes the collective lens 173, a light tunnel 175, a collective lens 178, a light axis turning mirror 181, a collective lens 183, a shining mirror 185, and a condenser lens 195. The condenser lens 195 emits image light emitted from the display device 51 disposed on a side of the condenser lens 195 that lies to face the rear panel 13 towards the projection optical system 220, and therefore, the condenser lens 195 constitutes part of the projection optical system 220.

The collective lens 173 is disposed at an end of the light tunnel 175, constituting a light guiding member, the end lying to face the second dichroic mirror 143. The collective lens 173 collects light in the green wavelength range, light in the blue wavelength range and light in the red wavelength range that are guided from the second dichroic mirror 143. The light in the green, blue and red wavelength ranges that is collected by the collective lens 173 is shined onto the color wheel 201 of the color wheel device 200.

The color wheel device 200 includes the color wheel 201 and a motor 210 that drives to rotate the color wheel 201. The color wheel device 200 is disposed between the collective lens 173 and the light tunnel 175 in such a manner that an axis of a pencil of light emitted from the collective lens 173 is at right angles to a shining surface on the color wheel 201.

Figure 3B:
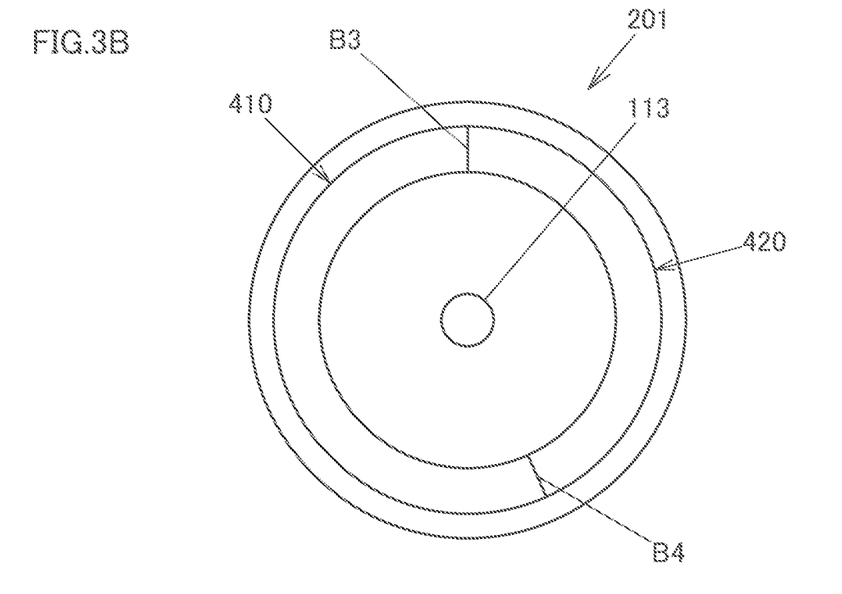
FIG. 3B is a schematic plan view of a color wheel according to the first embodiment of the present invention.

FIG. 3B is a schematic plan view of the color wheel 201. The color wheel 201 is formed into a disk shape and has a mounting hole portion 113 provided at a center thereof. Since the mounting hole portion 113 is fixed to a shaft portion of the motor 210, the color wheel 201 can rotate around the shaft portion when the motor 210 is driven to rotate.

The color wheel 201 includes an all color transmission area 410 (a second transmission area) and a blue and red transmission area 420 (a third transmission area) that are provided end to end in a circumferential direction. The all color transmission area 410 can transmit light in the blue wavelength range, light in the green wavelength range, and light in the red wavelength range. The blue and red transmission area 420 can transmit not only light in the blue wavelength range and light in the red wavelength range but also partial light on a long wavelength side of light in the green wavelength range and can cut off partial light on a short wavelength side of the light in the green wavelength range by absorbing it, for example. In this way, the color wheel 201 has the plurality of areas, and one of the plurality of areas constitutes an area where to select the light in the red wavelength range (light in the third wavelength range) and partial light on the long wavelength side of the light in the green wavelength range (light in the second wavelength range) that are combined together by the first dichroic mirror 142 (the combining device) as light in a fourth wavelength range. Specifically, in the light in the third wavelength range and the light in the second wavelength range excluding the light on the long wavelength range, the color wheel 201 transmits the light in the third wavelength range and light in the light in the second wavelength range that lies on the short wavelength side rather than on the long wavelength range. The area on the color wheel 201 where to make a selection for light in the fourth wavelength range is the third transmission area, and partial light on the long wavelength range of the light in the second wavelength range that passes through the color wheel to be selected as light in the fourth wavelength range is positioned on a longer wavelength side than a peak wavelength of the light in the second wavelength range and on a shorter wavelength side than a peak wavelength of the light in the third wavelength range.

In the color wheel 201 of this embodiment, the all color transmission area 410 is formed substantially over an angular range of 204 degrees, and the blue and red transmission area 420 is formed substantially over the remaining angular range of 156 degrees. The blue and red transmission area 420 is disposed separately from the all color transmission area 410 with boundaries B3, B4 defined therebetween.

Light passing through the all color transmission area 410 or the blue and red transmission area 420 is guided towards the light tunnel 175 in FIG. 2. A pencil of light that enters the light tunnel 175 is formed into a pencil of light whose luminous intensity is distributed evenly.

The collective lens 178 is disposed on an optical axis of the light tunnel 175 at an end lying to face the rear panel 13. Then, the light axis turning mirror 181 is disposed closer to the rear panel 13 than the collective lens 178. A pencil of light emerging from an emerging port of the light tunnel 175 is collected at the collective lens 178 and is then reflected towards the left panel 15 by the light axis turning mirror 181.

The pencil of light that is reflected by the light axis turning mirror 181 is collected by the collective lens 183, whereafter the pencil of light is shined onto the display device 51 at a predetermined angle via the condenser lens 195 by the shining mirror 185. A heat sink 190 is provided on a side of the display device 51, which is a digital micromirror device (DMD), lying to face the rear panel 13. The display device 51 is cooled by this heat sink 190.

Light source light that is shined on to an image forming plane of the display device 51 by the light source-side optical system 170 is reflected on the image forming plane of the display device 51 and is projected on to a screen via the projection optical system 220 as projected light. Here, the projection optical system 220 is made up of the condenser lens 195, the movable lens group 235, and a fixed lens group 225. The movable lens group 235 is configured to be moved by the lens motor 45. The movable lens group 235 and the fixed lens group 225 are incorporated in a fixed lens barrel. As a result, the fixed lens barrel including the movable lens group 235 is made as a variable-focus lens that can be adjusted for zooming and focusing.

The luminescent wheel 101 and the color wheel 201 can be rotated in synchronization with each other by configuring the projector 10 in the way described heretofore, and when light is emitted at arbitrary timings from the excitation light shining device 70 and the red light source device 120, light in the green, blue and red wavelength ranges is incident on the collective lens 173 via the light guiding optical system 140 and is then incident on the display device 51 via the light source-side optical system 170. Asa result, the display device 51 displays green, blue and red light in a time-sharing fashion in accordance with data, thereby making it possible to project a color image on to the screen.

Figure 4:
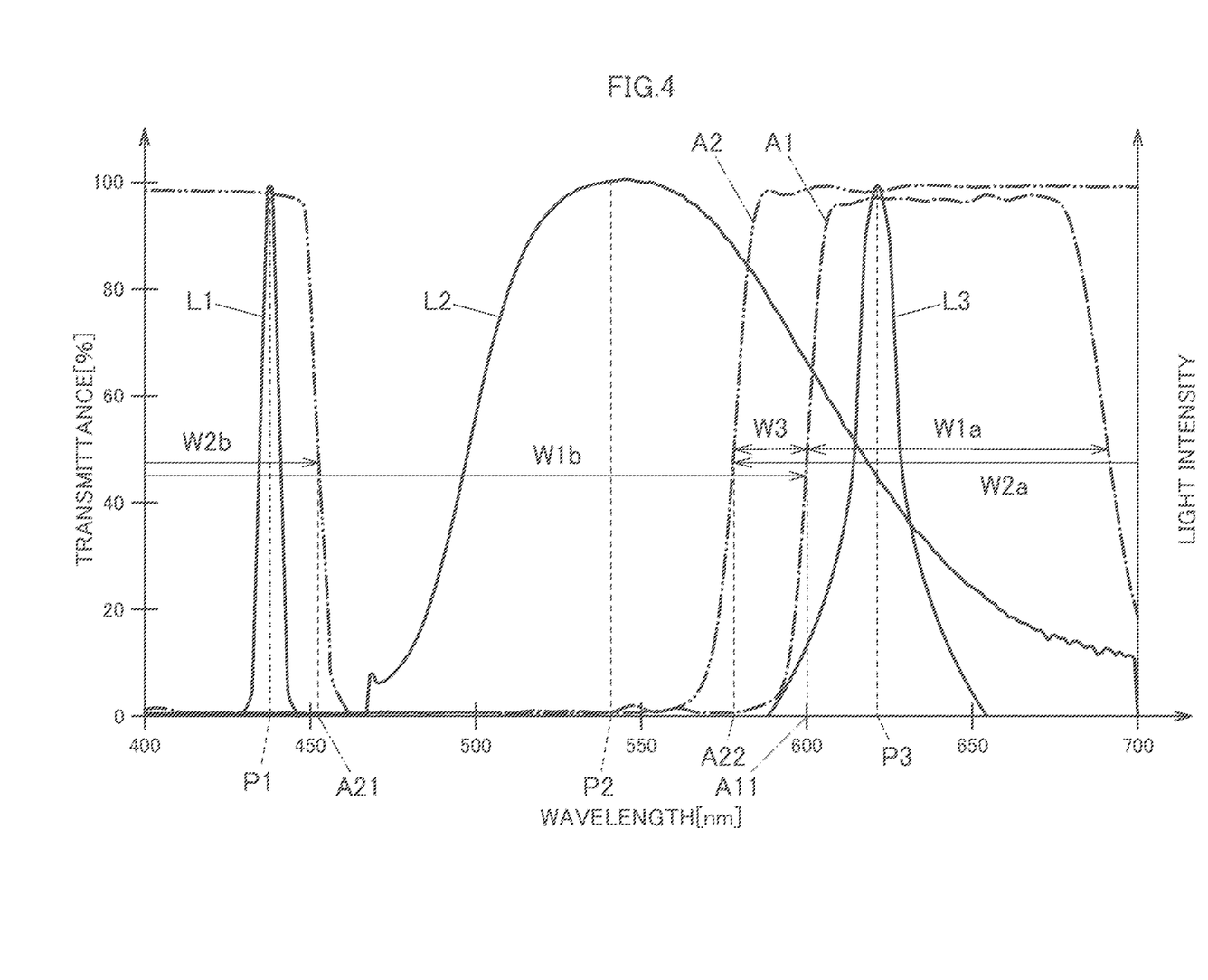
FIG. 4 is a graph showing a transmission characteristic of a second dichroic mirror and transmission characteristic of a blue and red light transmission area of the color wheel according to the first embodiment of the present invention.

Next, referring to FIG. 4, a transmission characteristic A1 of the first dichroic mirror 142 and a transmission characteristic A2 of the blue and red transmission area 420 of the color wheel 201 will be described. In FIG. 4, an axis of abscissas denotes wavelength, and a left axis of ordinates denotes respective transmissivities of the transmission characteristics A1, A2. Additionally, FIG. 4 shows a wavelength distribution of light in the blue wavelength range L1 emitted from the blue laser diodes 71, light in the green wavelength range L2 emitted from the luminescent light emitting area 310, and light in the red wavelength range L3 emitted from the red light emitting diode 121. In FIG. 4, a right axis of ordinates denotes luminous intensities of light in the blue wavelength range L1, light in the green wavelength range L2, and light in the red wavelength range L3.

Respective peak wavelengths P1, P2, P3 of light in the blue wavelength range L1, light in the green wavelength range L2 and light in the red wavelength range L3 are disposed sequentially in the order of light in the blue wavelength range L1, light in the green wavelength range L2, and light in the red wavelength range L3 from a short wavelength side. In this embodiment, light in the blue wavelength range L1 has a wavelength component ranging substantially from 430 nm to 440 nm, and light in the green wavelength range L2 has a wavelength component ranging substantially from 470 nm to 700 nm. Light in the red wavelength range L3, which is distributed on a longer wavelength side than light in the green wavelength range L2 has a wavelength component ranging substantially from 590 nm to 650 nm.

As indicated by the transmission characteristic A1, the first dichroic mirror 142 has a transmission range W1a that transmits light of a predetermined wavelength. The first dichroic mirror 142 reflects light in a reflection range W1b (a second range) lying on a shorter wavelength side than a cut-on wavelength A11 of the transmission range W1a. Consequently, the first dichroic mirror 142 can transmit almost all light in the red wavelength range L3 emitted from the red light emitting diode 121 to guide it towards the color wheel 201. Additionally, the first dichroic mirror 142 transmits partial light (light in the transmission range W1a) on a long wavelength side of light in the green wavelength range L2 emitted from the luminescent light emitting area 310 and reflects the other partial light on a short wavelength side (light in a reflection range W1b) of light in the green wavelength range L2 to guide it towards the color wheel 201. The partial light that is transmitted through the first dichroic mirror 142 constitutes light to be discarded.

As indicated by the transmission characteristic indicated by a chain double-dashed line, the blue and red transmission area 420 has a long wavelength side transmission range W2a (a first range) that transmits light of a predetermined wavelength and a transmission range W2b lying on a shorter wavelength side than the transmission range W2a. Additionally, the blue and red transmission area 420 can cut off light between a cut-off wavelength A21 of the transmission range W2b and a cut-on wavelength A22 of the transmission range W2a by absorbing it. Consequently, the blue and red transmission area 420 can transmit almost all light in the red wavelength range L3 emitted from the red light emitting diode 121 and light in the blue wavelength range L1 emitted from the blue laser diodes 71 to guide them to the light tunnel 175.

In this embodiment, an overlapping range W3 where a long wavelength side component of the reflection range W1b and a short wavelength side component of the transmission range W2a overlap each other is included. Since light in the green wavelength range L2 of the reflection range W1b that lies on a shorter wavelength side than the cut-on wavelength A11 of the first dichroic mirror 142 is guided to the blue and red transmission area 420 of the color wheel 201, the blue and red transmission area 420 can transmit light in the overlapping range W3 of light in the green wavelength range L2 emitted from the luminescent light emitting area 310 to guide it to the light tunnel 175. The overlapping range W3 is positioned on a longer wavelength side than the peak wavelength P2 of light in the green wavelength range L2 and on a shorter wavelength side of the peak wavelength P3 of light in the red wavelength range L3. Light in the overlapping range W3 that is taken out of light in the green wavelength range L2 and light in the red wavelength range L3 emitted from the red light emitting diode 121 can be combined together to thereby emit bright light in the red wavelength range as light source light of the light source unit 60.

Figure 5:
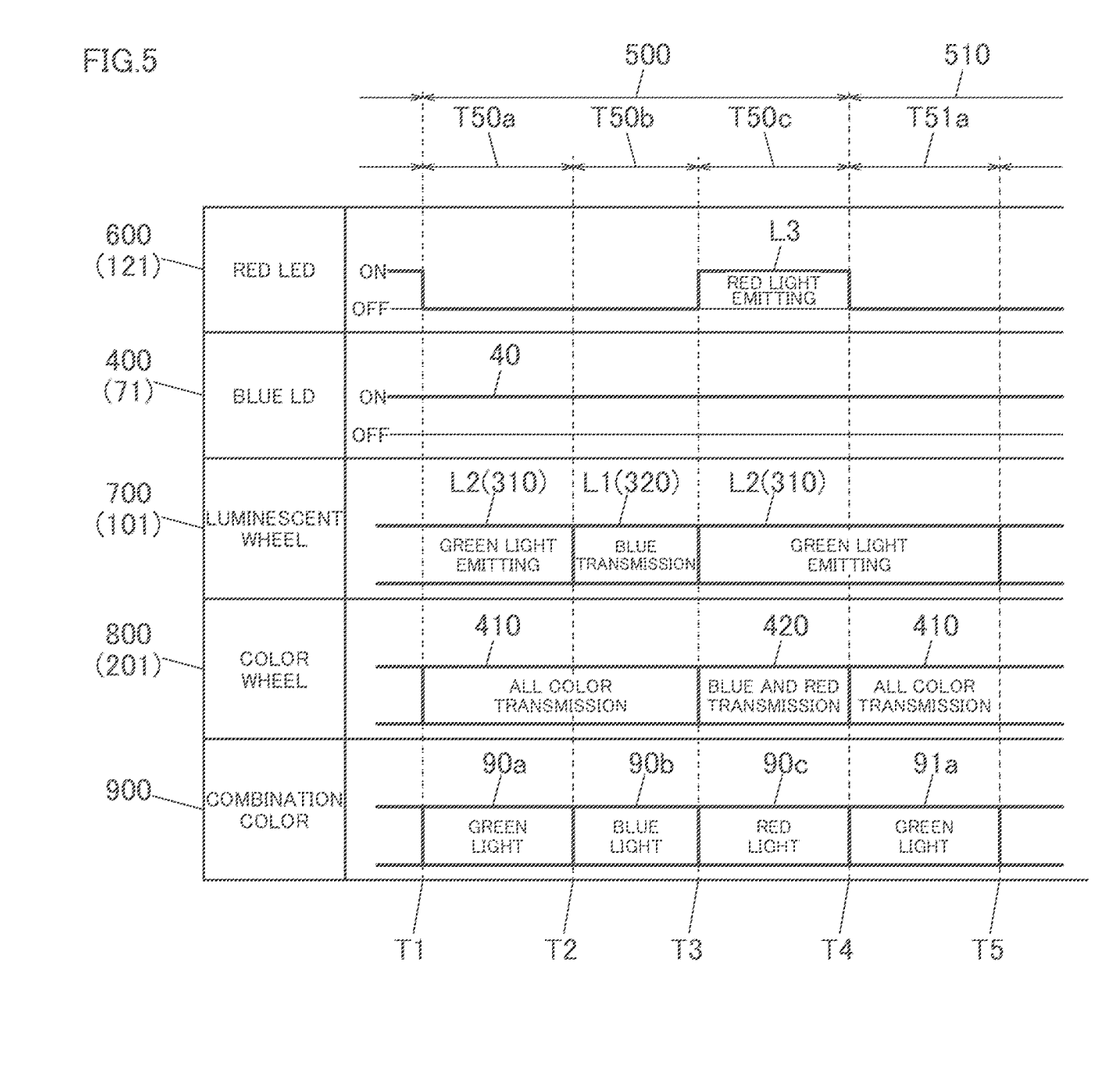
FIG. 5 is a timing chart of a light source unit according to the first embodiment of the present invention.

FIG. 5 is a timing chart of the light source unit 60. In this embodiment, the projector 10 projects a projected image formed by light source light of three colors onto the screen. The light source unit 60 forms one image every frame 500 and continuously projects images over a plurality of frames 500 in a time-sharing fashion. The light source unit 60 time shares the frame 500 in the order of a first output period T50a, a second output period T50b, and a third output period T50c and emits light of an allocated color in each of the output periods.

The red light emitting diode 121 turns off light in the red wavelength range L3 at the first output period T50a and the second output period T50b and emits light in the red wavelength range L3 at the third output period T50c. The blue laser diodes 71 emit light in the blue wavelength range L1 during a time period from the first output period T50a to the third output period T50c.

Since the light in the blue wavelength range L1 emitted from the blue laser diodes 71 is shined onto the luminescent light emitting area 310 of the luminescent wheel 101 at the first output period T50a, light in the green wavelength range L2 is emitted from the luminescent light emitting area 310. The light in the green wavelength range L2 emitted from the luminescent light emitting area 310 is guided to the all color transmission area 410 of the color wheel 210 by the light guiding optical system 140 (refer to FIG. 2). Since the all color transmission area 410 transmits light in the green wavelength range L2, the light source unit 60 guides light in the green wavelength range 90a to the light tunnel 175 as combined light 900 at the first output period T50a.

Since the light in the blue wavelength range L1 emitted from the blue laser diodes 71 is shined onto the transmission area 320 of the luminescent wheel 101 at the second output period T50b, the transmission area 320 transmits the light in the blue wavelength range L1 shined onto the transmission area 320. The light in the blue wavelength range L1 emitted from the transmission area 320 is guide by the light guiding optical system 140 to be shined onto the all color transmission area 410. Since the all color transmission area 410 transmits light in the blue wavelength range L1, the light source unit 60 guides light in the blue wavelength range 90$b$ to the light tunnel 175 as combined light 900 at the second output period T50$b$.

Light in the red wavelength range L3 emitted from the red light emitting diode 121 is guided by the light guiding optical system 140 to be shined onto the blue and red transmission area 420 of the color wheel 201 and is transmitted therethrough towards the light tunnel 175 at the third output period T50$c$. In addition, since light in the blue wavelength range L1 emitted from the blue laser diodes 71 is shined onto the luminescent light emitting area 310 of the luminescent wheel 101 at the third output period T50$c$, light in the green wavelength range L2 is emitted from the luminescent light emitting area 310. The light in the green wavelength range L2 emitted from the luminescent light emitting area 310 is guided by the light guiding optical system 140 to be shined onto the blue and red transmission area 420 of the color wheel 201. The blue and red transmission area 420 transmits light in the overlapping range W3 illustrated in FIG. 4. Consequently, the light source unit 60 guides light in the red wavelength range 90$c$ that results from combination of light in the red wavelength range L3 and the overlapping range W3 to the light tunnel 175 as combined light 900 at the third output period T50$c$.

When the third output period T50$c$ elapses, a first output period T51$a$ of the next frame 510 starts. As with the first output period T50$a$ described above, at the first output period T51$a$, the light source unit 60 controls the luminescent wheel 101 and the color wheel 201 and emits light in the green wavelength range 91$a$ as combined light 900. Similar operations to those of the frame 500 will be repeated from the following frame on.

In FIG. 5, the light in the green wavelength range 90$a$, the light in the blue wavelength range 90$b$, and the light in the red wavelength range 90$c$ are described as being emitted at the first output period T50$a$, the second output period T50$b$, and the third output period T50$c$, respectively, at all times. However, a period when the red light emitting diode 121 and the blue laser diodes 71 are turned off may be provided as required at the output periods T50$a$, T50$b$, T50$c$ so as to adjust the quantities of the light in the green wavelength range 90$a$, the light in the blue wavelength range 90$b$, and the light in the red wavelength range 90$c$ that are emitted at the output periods T50$a$, T50$b$, and T50$c$, respectively.

Second Embodiment

Figure 6:
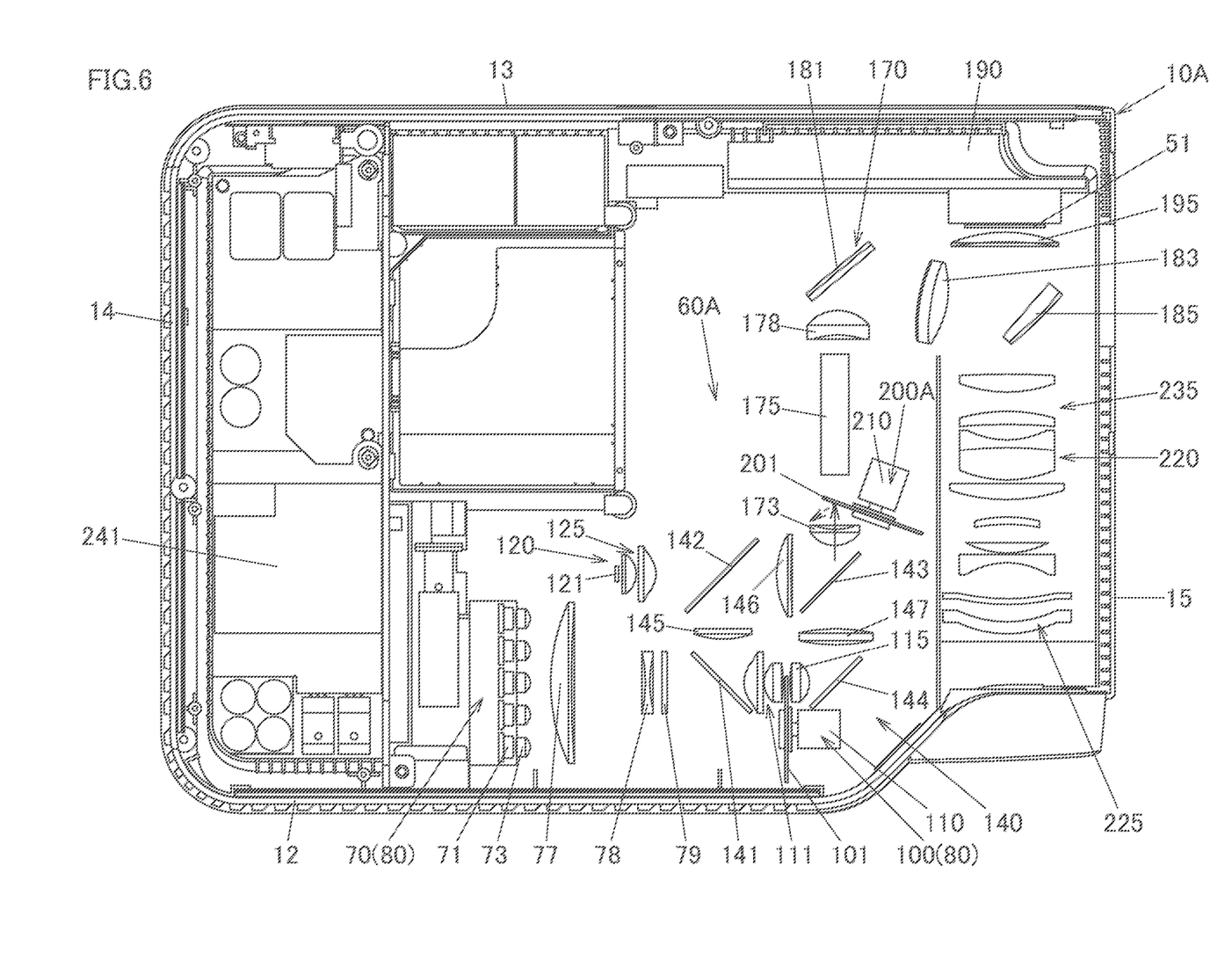
FIG. 6 is a schematic plan view illustrating an internal structure of a projector according to a second embodiment of the present invention.

Next, a second embodiment will be described. FIG. 6 is a schematic plan view illustrating an internal structure of a projector 10A of the second embodiment. Light in the green wavelength range, light in the blue wavelength range, or light in the red wavelength range that is shined onto the all color transmission area 410 or the blue and red transmission area 420 of the color wheel 201 illustrated in FIG. 3B in the first embodiment may sometimes be reflected partially without being transmitted or absorbed. It is considered that light in the green wavelength range, light in the blue wavelength range, or light in the red wavelength range that is so reflected is shined onto the luminescent light emitting area 310, the blue laser diodes 71, or the red light emitting diode 121 to thereby induce a reduction in the light emission efficiency or a reduction in service life of those light emitting devices, and therefore, in the second embodiment, a configuration for preventing the occurrence of the problem described above will be described. In the following description, like reference signs will be given to like configurations to those of the first embodiment, so that the description thereof will be omitted or simplified herein.

A light source unit 60A of this embodiment includes a color wheel device 200A in which the color wheel device 200 of the first embodiment is disposed while being inclined. In a color wheel 201 of the color wheel device 200A, incident surfaces of an all color transmission area 410 and a blue and red transmission area 420 are inclined with respect to light axis of light in the blue wavelength range, light in the green wavelength range, and light in the red wavelength range. The all color transmission area 410 and the blue and red transmission area 420 of the color wheel 201 are disposed in the same way as in the configuration of the first embodiment illustrated in FIG. 3B. Light emitting timings of a red light emitting diode 121 and blue laser diodes 71, and a synchronization timing of a luminescent wheel 101 and the color wheel 201 can also be controlled in the same way as done in the first embodiment.

Light in the red wavelength range L3 emitted from the red light emitting diode 121 at the third output period T50$c$ in FIG. 5 is shined onto the blue and red transmission area 420 of the color wheel 201. In addition, light in the green wavelength range L2 emitted from a luminescent light emitting area 310 at the third output period T50$c$ is shined onto the blue and red transmission area 420 of the color wheel 201.

At this time, part of the light in the green wavelength range L2 that is guided by the light guiding optical system 140 to be shined onto the blue and red transmission area may sometimes be reflected by the blue and red transmission area 420 without being absorbed or transmitted (refer to an arrow indicated by a broken line in FIG. 6) . However, since the color wheel 201 is inclined with respect to the axis of the light in the green wavelength range L2, the light in the green wavelength range L2 that is reflected by the blue and red transmission area 420 is not incident on the collective lens 173 again to be guided towards the light guiding optical system 140 but is reflected towards an inner wall, not shown, of the light source unit 60A or the like. In this way, a wheel surface of the color wheel 201 is disposed in such a manner as to be inclined with respect to axes of light in the blue wavelength range (light in a first wavelength range) and light in the red wavelength range (light in a third wavelength range) . Consequently, a possibility of a reduction in light emitting efficiency or a reduction in service life of the luminescent light emitting area 310 that would otherwise be caused by an increase in temperature of the luminescent light emitting area 310 can be reduced.

In the case where the cut-on wavelength A22 of the transmission characteristic A2 of the color wheel 201 shown in FIG. 4 has an angle dependency, the transmission characteristic A2 can be set so that part of the light in the green wavelength range L2 is transmitted in accordance with an angle at which the color wheel 201 is inclined with respect to the axis of the light in the green wavelength range L2.

Additionally, a possibility of the light in the red wavelength range L3 that is emitted from the red light emitting diode 121 at the third output period T50$c$ being partially reflected by the blue and red transmission area 420 to be returned to the red light emitting diode 121 can also be reduced.

Further, even though the light in the green wavelength range L2 that is emitted from the luminescent light emitting area 310 at the first output period T50a is reflected by the all color transmission area 410, a possibility of the light in the green wavelength range L2 being shined onto the luminescent light emitting area 310 can be reduced. Even though the light in the blue wavelength range L1 emitted from the blue laser diodes 71 at the second output period T50b is reflected by the all color transmission area 410, a possibility of the light in the blue wavelength range L1 being shined onto the blue laser diodes 71 can be reduced.

Thus, according to this embodiment, the increase in temperature of the blue laser diodes 71, the luminescent light emitting area 310 and the red light emitting diode 121, which are all the light source devices, can be reduced, whereby the possibility of a reduction in light emitting efficiency or service life of the light source devices can be reduced. In addition, since the light source unit 60A can emit bright light in the red wavelength range 90c as combined light 900, a projected image that is bright as a whole can be projected on to a screen or the like.

Modified Examples

In the first embodiment and the second embodiment, while the green luminescent material layer that emits light in the green wavelength range is described as being formed on the luminescent wheel 101 as the luminescent light emitting area 310, the luminescent light emitting area 310 may include a green luminescent material layer configured to emit light in the green wavelength range and a yellow luminescent material layer configured to emit light in the yellow wavelength range, the green luminescent material layer and the yellow luminescent material layer being provided end to end in a circumferential direction.

In this case, in the event that light in the yellow wavelength range emitted from the luminescent light emitting area 310 is designed to be transmitted through the all color transmission area 410 of the color wheel 201, the light source devices 60, 60A can guide the light in the yellow wavelength range to the light tunnel 175 as combined light 900.

In the case where light in the red wavelength range is emitted as combined light 900, as with the first embodiment and the second embodiment, light in the red wavelength range emitted from the red light emitting diode 121 and part of light in the green wavelength range emitted from the luminescent light emitting area 310 are guided to the light tunnel 175, so that bright light in the red wavelength range can be emitted as combined light 900.

Thus, according to the embodiments, the light source devices 60, 60A can emit light in the blue wavelength range, light in the green wavelength range, light in the yellow wavelength range, and light in the red wavelength range in a time-sharing fashion and can project an image that is bright as a whole onto a screen or the like.

The positions of the cut-off wavelength A21 and the cut-on wavelength A11 shown in FIG. 4 in the first embodiment are illustrated as being the wavelengths at which the transmissivities of the transmission characteristics A1, A2 become 50% as a matter of description. However, the transmission characteristics A1, A2 can be set as required, and hence, the transmission characteristics A1, A2 can be set, for example, at such wavelengths that the transmissivities become 95%.

Additionally, in FIGS. 2 and 6, the first dichroic mirror 142 is described as reflecting light in the green wavelength range and transmitting light in the red wavelength range. However, the first dichroic mirror 142 may transmit light in the green wavelength range and reflect light in the red wavelength range to thereby guide light in the green wavelength range and light in the red wavelength range towards the second dichroic mirror 143 by changing the arrangement of the light guiding optical system 140.

Similarly, the second dichroic mirror 143 is described as reflecting light in the green wavelength range and light in the red wavelength range and transmitting light in the blue wavelength range. However, the second dichroic mirror 143 may transmit light in the green wavelength range and light in the red wavelength range and reflect light in the blue wavelength range to thereby guide light in the green wavelength range, light in the red wavelength range, and light in the blue wavelength range towards the color wheel 201 by changing the arrangement of the light guiding optical system 140.

In the embodiments, light in the blue wavelength range (light in the first wavelength range) is described as being emitted by use of the blue laser diodes 71 (the first light emitting device), but the present invention is not limited to this configuration. For example, an ultraviolet laser diode that emits a laser beam in the ultraviolet wavelength range may be used as the excitation light source that excites the luminescent light emitting area of the luminescent wheel in place of the blue laser diodes 71. In this case, the first transmission area that transmits light in the blue wavelength range (light in the first wavelength range) becomes unnecessary. Instead, a semiconductor light emitting device such as a blue LED that emits light in the blue wavelength range (light in the first wavelength range) needs to be provided separately. For example, a blue LED can be disposed in a position lying opposite to the color wheel 201 with respect to the second dichroic mirror 143. In this case, too, the characteristics of the second dichroic mirror 143 may remain the same as those of the embodiments described above.

In the embodiments described above, in the color wheel 201, the all color transmission area 410 (the second transmission area) and the blue and red transmission area 420 (the third transmission area) are described as being provided end to end in the circumferential direction. Further, in this configuration, light in the green wavelength range and light in the blue wavelength range are described as being transmitted through the all color transmission area 410 (the second transmission area) of the color wheel 201 at both the timings of the first output period T50a that is the green emitting timing and the second output period T50b that is the blue emitting timing. However, the present invention is not limited to this configuration. A configuration may be adopted in which at the first output period T50a that is the green emitting timing, light in the green wavelength range is transmitted through the transmission area of the color wheel 201 where the light in the second wavelength range is transmitted, and at the second output period T50b that is the blue emitting timing, light in the blue wavelength range is transmitted through the transmission area transmitting the light in the first wavelength range which differs from the transmission area transmitting light in the second wavelength range.

Thus, in the light source unit 60 and the projector 10 that are described in the embodiments, the light source unit 60 includes the first light emitting device, the second light emitting device, the luminescent wheel 101, and the color wheel 201. The luminescent wheel 101 includes the first transmission area that transmits light in the first wavelength range emitted from the first light emitting device and the luminescent light emitting area 310 that emits luminescent light excited by the light in the first wavelength range as light in the second wavelength range. The second light emitting device emits light in the third wavelength range that is distributed on the longer wavelength side than light in the second wavelength range. Additionally, the color wheel 201 includes the second transmission area that transmits light in the first wavelength range to light in the third wavelength range and the third transmission area that transmits light in the first range of the light in the second wavelength range that lies on the long wavelength side thereof together with light in the third wavelength range. As a result, not only light in the third wavelength range but also light in the range lying adjacent to the light in the third wavelength range can be emitted while being superposed on each other, and hence, even in the case where the visual sensitivity of light in the third wavelength range is low, a bright color can be projected, whereby the color balance can be improved.

The light source units 60, 60A include the first dichroic mirror that reflects or transmits light in the second range of light in the second wavelength range that lies on the short wavelength side thereof and transmits or reflects light in the third wavelength range to guide the light in the second range of the light in the second wavelength range and the light in the third wavelength range towards the color wheel 201. The long wavelength side component of the second range and the short wavelength side component of the first range include the overlapping range W3 where the long wavelength side component and the short wavelength side component overlap each other. As a result, light in the overlapping range W3 that lies adjacent to light in the third wavelength range can be emitted together with light in the third wavelength range, whereby the color of light in the third wavelength range can be made bright visually.

In the light source units 60, 60A, the overlapping range W3 is positioned closer to the long wavelength side than the peak wavelength P2 of light in the second wavelength range and closer to the short wavelength side than the peak wavelength P3 of light in the third wavelength range, and the light source units 60, 60A that are configured in this way can emit light in the range of the light in the second wavelength range that lies close to light in the third wavelength range together with the light in the third wavelength range as combined light 900.

The light source units 60, 60A include the second dichroic mirror that reflects or transmits the light in the second wavelength range and the light in the third wavelength range that are emitted from the first dichroic mirror and transmits or reflects light in the first wavelength range guided from the luminescent wheel 101 to guide the light in the first wavelength range to the light in the third wavelength range to the color wheel 201, and the light source unit 60, 60A that are configured in this way can combine the light in the first wavelength range to the light in the third wavelength range to emit them as light from the light sources in a time-sharing fashion.

In the light source unit 60A, the first transmission area and the second transmission area of the color wheel 201 are inclined with respect to the axes of light in the first wavelength range to light in the third wavelength range, and the light source unit 60A that is configured in this way can reduce the possibility that the light in the first wavelength range to the light in the third wavelength range are returned to the first light emitting device, and the luminescent light emitting area 310 or the second light emitting device to be shined onto them to thereby reduce the possibility that the light emitting efficiency or the service life of the first light emitting device, the luminous light emitting area 310 or the second light emitting device is reduced due to the increase in temperature at the first light emitting device, the luminous light emitting area 310 or the second light emitting device, The light source units 60, 60A control the first output period T50a when light in the second wavelength range emitted from the luminescent light emitting area 310 is shined onto the second transmission area, the second output period T50b when light in the first wavelength range that is transmitted through the first transmission area is shined onto the second transmission area, and the third output period T50c when light in the third wavelength range is shined onto the third transmission area and light in the second wavelength range emitted from the luminescent wheel 101 is shined onto the third transmission area in a time-sharing fashion, and hence, the light source units 60, 60A can emit light in the different colors in a time-sharing fashion to thereby form an image.

The first light emitting device is made up of the blue laser diodes 71, the second light emitting device is made up of the red light emitting diode 121, the light in the first wavelength range is made up of the light in the blue wavelength range L1, the light in the second wavelength range is made up of the light in the green wavelength range L2, and the light in the third wavelength range is made up of the light in the red wavelength range L3 that is distributed on the longer wavelength side than the light in the second wavelength range, and therefore, the light source units 60, 60A can emit light source light that can form a color image.

The embodiments are presented as examples, and hence, there is no intention to limit the scope of the present invention by the embodiments. The novel embodiments can be carried out in other various forms, and various omissions, replacements and modifications can be made thereto without departing from the spirit and scope of the present invention. Those resulting embodiments and their modifications are included in the scope and gist of the present invention and are also included in the scope of inventions claimed for patent under claims below and their equivalents.

What is claimed is:
1. A light source unit, comprising:
a first light emitting device configured to emit light in a first wavelength range;
a luminescent wheel comprising a luminescent light emitting area configured to emit luminescent light that is excited by the light in the first wavelength range as light in a second wavelength range;
a color wheel onto which the light in the first wavelength range and the light in the second wavelength range are shined, the color wheel comprising a filter that selects a part of the wavelength from the shined light in the first wavelength range and the light in the second wavelength range; and
a second light emitting device configured to emit light in a third wavelength range that is distributed on a longer wavelength side than the light in the second wavelength range,
wherein:
a wheel surface of the color wheel is inclined with respect to axes of the light in the first wavelength range, the light in the second wavelength range, and the light in the third wavelength range, and
partial light on a long wavelength side of the light in the second wavelength range that is transmitted through the color wheel to be selected as light in a fourth wavelength range is positioned closer to the long wavelength side of the light in the second wavelength range than a peak wavelength thereof and closer to a short wave- length side of the light in the third wavelength range than a peak wavelength thereof.

2. The light source unit according to claim 1, wherein:
the luminescent wheel comprises a first transmission area configured to transmit the light in the first wavelength range, and
the color wheel further comprises a second transmission area configured to transmit the light in the first wavelength range and the light in the second wavelength range, and a third transmission area configured to select the light in the third wavelength range and the partial light on the long wavelength side of the light in the second wavelength range as the light in the fourth wavelength range.

3. The light source unit according to claim 2, further comprising:
a control unit configured to control the first light emitting device, the second light emitting device, the luminescent wheel, and the color wheel to thereby control the light in the second wavelength range and the light in the fourth wavelength range in a time-sharing fashion.

4. The light source unit according to claim 2, further comprising:
a combining device configured to combine the light in the second wavelength range and the light in the third wavelength range to a same light axis,
wherein the light in the third wavelength range and the partial light on the long wavelength side of the light in the second wavelength range are combined together by the combining device.

5. The light source unit according to claim 3, wherein in the time-sharing fashion of the control unit, time is divided into:
a first output period in which the light in the second wavelength range is shined onto the fourth transmission area of the color wheel;
a second output period in which the light in the first wavelength range is shined onto the fourth transmission area of the color wheel; and
a third output period in which the light in the third wavelength range and light excluding light on a first long wave side of the light in the second wavelength range are shined onto a fifth transmission area which selects the light in the third wavelength range and the light excluding the light on the first long wave side of the light in the second wavelength range as the light in the fourth wavelength range of the color wheel.

6. The light source unit according to claim 4, wherein the combining device comprises a first dichroic mirror configured to reflect light excluding light on a first long wave side of the light in the second wavelength range and transmit the light in the third wavelength range or configured to transmit the light excluding the light on the first long wave side of the light in the second wavelength range and reflect the light in the third wavelength range, to thereby guide the light excluding the light on the first long wave side of the light in the second wavelength range and the light in the third wavelength range towards the color wheel.

7. The light source unit according to claim 6, wherein the color wheel transmits, in the light in the third wavelength range and the light excluding the light on the first long wavelength range of the light in the second wavelength range that are combined by the first dichroic mirror, the light in the third wavelength range and light on a second long wavelength side of the light in the second wavelength range, the second long wavelength side lying on a shorter wavelength side than the first long wavelength side.

8. The light source unit according to claim 6, further comprising a second dichroic mirror configured to reflect the light excluding the light on the first long wavelength side of the light in the second wavelength range and the light in the third wavelength range that are combined together by the first dichroic mirror and transmit the light in the first wavelength range or configured to transmit the light excluding the light on the first long wavelength side of the light in the second wavelength range and the light in the third wavelength range that are combined together by the first dichroic mirror and reflect the light in the first wavelength range, to thereby guide the light in the first wavelength range and the light in the third wavelength range towards the color wheel.

9. The light source unit according to claim 1, further comprising:
a collective lens configured to collect the light in the first wavelength range, the light in the second wavelength range, and the light in the third wavelength range,
wherein light in green, blue, and red wavelength ranges that is collected by the collective lens is shined onto the color wheel.

10. The light source unit according to claim 9, wherein:
the color wheel further comprises a third transmission area configured to select the light in the third wavelength range and the partial light on the long wavelength side of the light in the second wavelength range as the light in the fourth wavelength range, and
a part of the light in the second wavelength range collected by the collective lens and shined onto the third transmission area of the color wheel is reflected in the third transmission area and is not incident on the collective lens.

11. The light source unit according to claim 1, wherein:
the first light emitting device comprises a blue laser diode,
the second light emitting device comprises a red light emitting diode,
the light in the first wavelength range comprises light in a blue wavelength range,
the light in the second wavelength range comprises light in a green wavelength range, and
the light in the third wavelength range comprises light in a red wavelength range.

12. The light source unit according to claim 11, wherein:
the luminescent light emitting area includes a green luminescent material layer configured to emit the light in the green wavelength range and a yellow luminescent material layer configured to emit light in a yellow wavelength range, the green luminescent material layer and the yellow luminescent material layer being provided end to end in a circumferential direction, and
the light in the yellow wavelength range emitted from the luminescent light emitting area is transmitted transmittable through an all color transmission area of the color wheel.

13. A projector, comprising:
the light source unit according to claim 1;
a display device configured to generate image light; and
a projection optical system configured to project the image light emitted from the display device onto a screen,
wherein the control unit controls the light source unit and the display device.

14. A light source unit, comprising:
a first light emitting device configured to emit light in a first wavelength range;

a luminescent wheel comprising a luminescent light emitting area configured to emit luminescent light that is excited by the light in the first wavelength range as light in a second wavelength range, and a first transmission area configured to transmit the light in the first wavelength range;
a color wheel onto which the light in the first wavelength range and the light in the second wavelength range are shined, the color wheel comprising a filter that selects a part of the wavelength from the shined light in the first wavelength range and the light in the second wavelength range, a second transmission area configured to transmit the light in the first wavelength range and the light in the second wavelength range, and a third transmission area configured to select the light in the third wavelength range and partial light on a long wavelength side of the light in the second wavelength range as light in a fourth wavelength range;
a second light emitting device configured to emit light in a third wavelength range that is distributed on a longer wavelength side than the light in the second wavelength range; and
a collective lens configured to collect the light in the first wavelength range, the light in the second wavelength range, and the light in the third wavelength range,
wherein:
a wheel surface of the color wheel is inclined with respect to axes of the light in the first wavelength range, the light in the second wavelength range, and the light in the third wavelength range,
light in green, blue, and red wavelength ranges that is collected by the collective lens is shined onto the color wheel, and
a part of the light in the second wavelength range collected by the collective lens and shined onto the third transmission area of the color wheel is reflected in the third transmission area and is not incident on the collective lens.

15. A light source unit, comprising:
a first light emitting device configured to emit light in a first wavelength range;
a luminescent wheel comprising a luminescent light emitting area configured to emit luminescent light that is excited by the light in the first wavelength range as light in a second wavelength range, and a first transmission area configured to transmit the light in the first wavelength range;
a color wheel onto which the light in the first wavelength range and the light in the second wavelength range are shined, the color wheel comprising a filter that selects a part of the wavelength from the shined light in the first wavelength range and the light in the second wavelength range, a second transmission area configured to transmit the light in the first wavelength range and the light in the second wavelength range, and a third transmission area configured to select the light in the third wavelength range and partial light on a long wavelength side of the light in the second wavelength range as light in a fourth wavelength range;
a second light emitting device configured to emit light in a third wavelength range that is distributed on a longer wavelength side than the light in the second wavelength range; and
a control unit configured to control the first light emitting device, the second light emitting device, the luminescent wheel, and the color wheel to thereby control the light in the second wavelength range and the light in the fourth wavelength range in a time-sharing fashion,
wherein:
a wheel surface of the color wheel is inclined with respect to axes of the light in the first wavelength range, the light in the second wavelength range, and the light in the third wavelength range, and
in the time-sharing fashion of the control unit, time is divided into:
a first output period in which the light in the second wavelength range is shined onto the fourth transmission area of the color wheel;
a second output period in which the light in the first wavelength range is shined onto the fourth transmission area of the color wheel; and
a third output period in which the light in the third wavelength range and light excluding light on a first long wave side of the light in the second wavelength range are shined onto a fifth transmission area which selects the light in the third wavelength range and the light excluding the light on the first long wave side of the light in the second wavelength range as the light in the fourth wavelength range of the color wheel.

16. A light source unit, comprising:
a first light emitting device configured to emit light in a first wavelength range;
a luminescent wheel comprising a luminescent light emitting area configured to emit luminescent light that is excited by the light in the first wavelength range as light in a second wavelength range, and a first transmission area configured to transmit the light in the first wavelength range;
a color wheel onto which the light in the first wavelength range and the light in the second wavelength range are shined, the color wheel comprising a filter that selects a part of the wavelength from the shined light in the first wavelength range and the light in the second wavelength range, a second transmission area configured to transmit the light in the first wavelength range and the light in the second wavelength range, and a third transmission area configured to select the light in the third wavelength range and partial light on a long wavelength side of the light in the second wavelength range as light in a fourth wavelength range;
a second light emitting device configured to emit light in a third wavelength range that is distributed on a longer wavelength side than the light in the second wavelength range; and
a combining device configured to combine the light in the second wavelength range and the light in the third wavelength range to a same light axis,
wherein:
a wheel surface of the color wheel is inclined with respect to axes of the light in the first wavelength range, the light in the second wavelength range, and the light in the third wavelength range,
the light in the third wavelength range and the partial light on the long wavelength side of the light in the second wavelength range are combined together by the combining device, and
the combining device comprises a first dichroic mirror configured to reflect light excluding light on a first long wave side of the light in the second wavelength range and transmit the light in the third wavelength range or configured to transmit the light excluding the light on the first long wave side of the light in the second wavelength range and reflect the light in the third wavelength range, to thereby guide the light excluding the light on the first long wave side of the light in the second wavelength range and the light in the third wavelength range towards the color wheel.

17. The light source unit according to claim 16, wherein the color wheel transmits, in the light in the third wavelength range and the light excluding the light on the first long wavelength range of the light in the second wavelength range that are combined by the first dichroic mirror, the light in the third wavelength range and light on a second long wavelength side of the light in the second wavelength range, the second long wavelength side lying on a shorter wavelength side than the first long wavelength side.

18. The light source unit according to claim 16, further comprising a second dichroic mirror configured to reflect the light excluding the light on the first long wavelength side of the light in the second wavelength range and the light in the third wavelength range that are combined together by the first dichroic mirror and transmit the light in the first wavelength range or configured to transmit the light excluding the light on the first long wavelength side of the light in the second wavelength range and the light in the third wavelength range that are combined together by the first dichroic mirror and reflect the light in the first wavelength range, to thereby guide the light in the first wavelength range and the light in the third wavelength range towards the color wheel.

* * * * *

UNITED STATES PATENT AND TRADEMARK OFFICE
CERTIFICATE OF CORRECTION

PATENT NO. : 11,714,345 B2
APPLICATION NO. : 17/592026
DATED : August 1, 2023
INVENTOR(S) : Chihaya Sugiyama Page 1 of 1

It is certified that error appears in the above-identified patent and that said Letters Patent is hereby corrected as shown below:

In the Claims

Column 18, Line 53, after "area is" delete "transmitted".

Signed and Sealed this
Nineteenth Day of September, 2023

Katherine Kelly Vidal
*Director of the United States Patent and Trademark Office*